March 13, 1951  W. J. CAMERON  2,544,914
INSPECTION DEVICE
Filed July 18, 1945  2 Sheets-Sheet 1
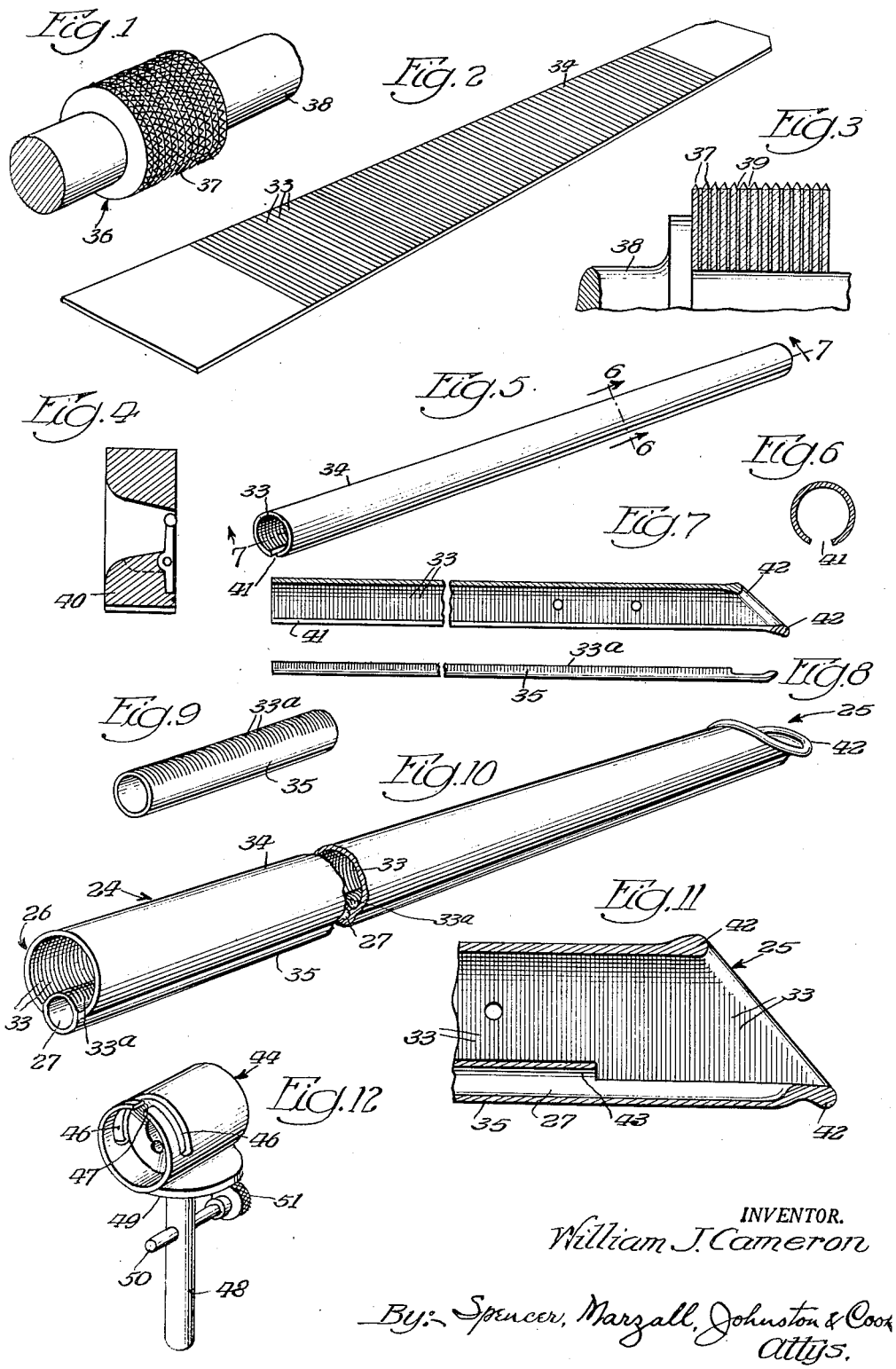
INVENTOR.
William J. Cameron
By: Spencer, Marzall, Johnston & Cook
Attys.

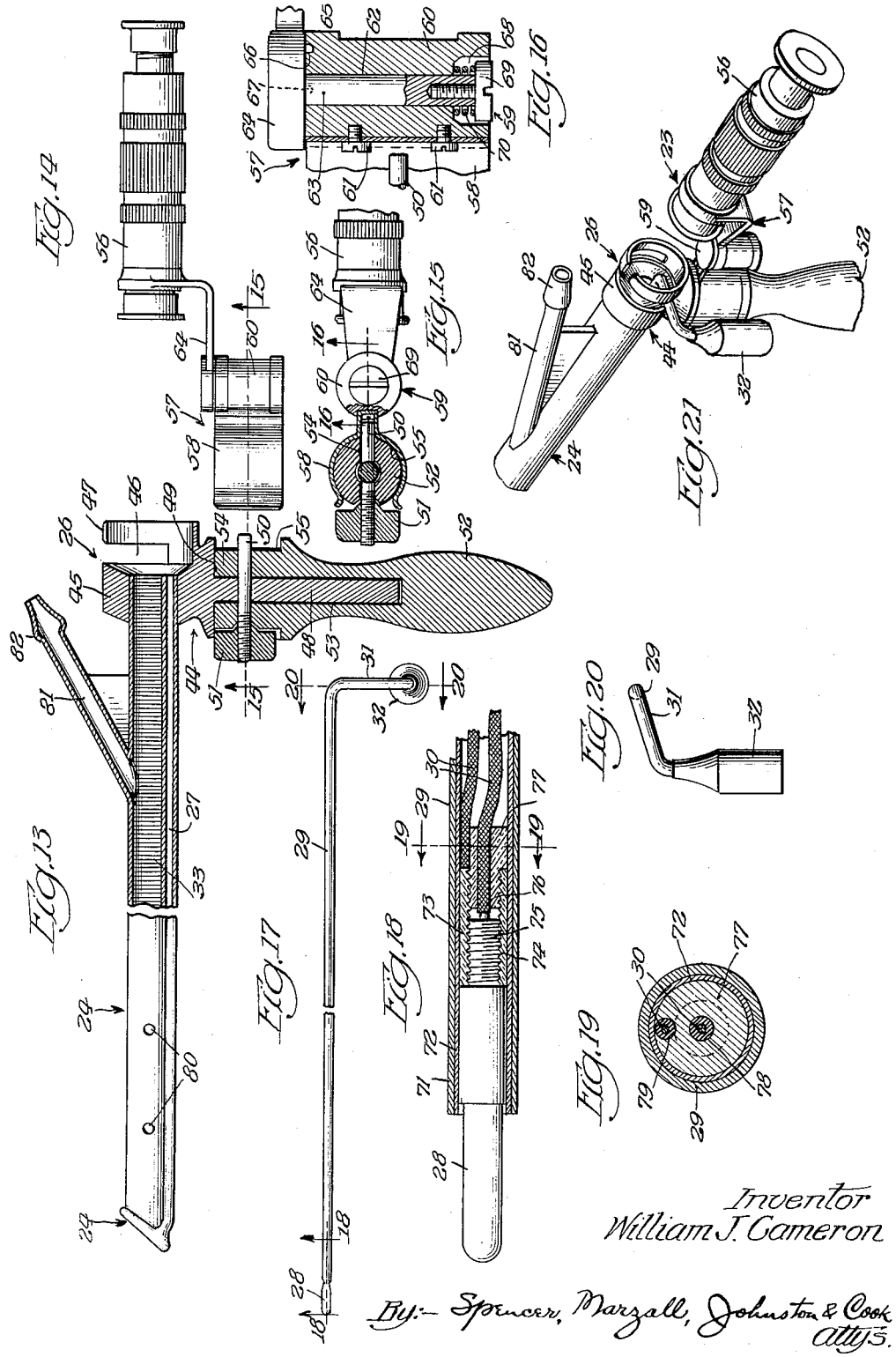

Patented Mar. 13, 1951

2,544,914

UNITED STATES PATENT OFFICE 2,544,914

INSPECTION DEVICE

William J. Cameron, Chicago, Ill.

Application July 18, 1945, Serial No. 605,667

8 Claims. (Cl. 128—4)

The present invention relates in general to instruments, generally classified as scopes, for the general inspection of restricted body cavities, the invention having more particular reference to an improved bronchoscope.

Instruments of the character mentioned may comprise a tube adapted for insertion in the cavity to be inspected and having a lamp carried in position to illuminate the tissues, at the cavity inserted end of the instrument, said end being commonly referred to as the distal end. Inspection of the illuminated tissues is, of course, accomplished by viewing the same through the tube from its distal remote or ocular end.

In instruments of the character mentioned, the view of illuminated tissues may be appreciably impaired by glare due to multiple reflection of the light source at the distal end of the tube, upon the inner surfaces of the tube. Such reflections, reaching the eye of the observer at the ocular end of the tube, may interfere with the image of the illuminated tissues under observation and reduce the clarity of the tissue image obtainable at the ocular end of the instrument. Such impairment of the tissue image cannot be eliminated by reducing the intensity of the illumination without undesirably reducing illumination of the tissues to be inspected.

An important object of the present invention is to provide a tubular inspection device in which the view of illuminated tissues is not impaired by light glare caused by reflections of the light source on the inner surfaces of the tube.

Another important object is to prevent glare in scope instruments by striating the inner surfaces of the viewing tube; a further object being to eliminate glare by transversely grooving the inner surfaces of the tube to provide glare eliminating striae; a still further object being to form the striations by transversely grooving a strip of tube material while in flat condition and then forming the strip to tubular form.

Another important object is to provide an inspection tube having a lamp at its distal end and a longitudinal duct in the walls of the tube for the reception and insulation of electrical conductor means for energizing the lamp, the duct comprising a tube of relatively small bore and the inspection tube comprising a tube forming strip of material bent to tubular form with its opposite side edges secured to the opposite sides of the duct forming tube; a further object being to striate the inner surfaces of said tube forming strip as well as the outer surfaces of the small bore tube, which form a longitudinal wall portion of the inspection tube.

Another important object is to mount the lamp at an end of a support stem adapted for insertion in the duct forming portions of the inspection device, whereby a lamp and its support stem may be readily inserted and withdrawn from operative position by merely sliding the same telescopically into or out of the duct forming tube portions of the inspection device; a further object being to provide the inspection device, at its ocular end, and the lamp carrying tubular stem, at its lamp remote end, with interfitting means for latching the lamp and stem in operative position in the instrument.

Another important object is to mount the inspection tube, at its ocular end, in a support fitting form with bayonet slot means for interfitting latching enagement with the lamp remote end of the lamp carrying stem; a further object being to form the said fitting for detachable clamping reception of a convenient handle for the manipulation of the instrument; a still further object being to form said fitting, also, for the detachable reception of a magnifying eyepiece or viewer in position, at the ocular end of the instrument, to facilitate inspection of illuminated tissue, at the distal end, through the viewing tube and said eyepiece.

Another important object is to provide an inspection device with means embodying a clamp, for the detachable reception of a suitable handle, and also a support for a removable eyepiece, said means, in addition affording facilities for latching a lamp in place in the instrument; a further object being to employ a portion of the handle clamp to index or orient the eyepiece on its support, in alignment with the viewing tube of the instrument; a still further object being to provide an eyepiece, such as a focusing telescope having a detachable clip mounting for removably supporting the same in aligned position on the instrument; yet another object being to pivotally mount the eyepiece in its clip so that the same may be swung from aligned position to an offset position permitting eye inspection directly through the tube at its ocular end.

Another important object is to provide improved means for mounting a small, so-called "grain of wheat" lamp at the end of a tubular support stem, including improved facilities for energizing the lamp by means of insulated conductors extending through the tubular support stem.

Another important object is to form the lamp remote end of the support stem with bent and offset portions to facilitate manipulation of the lamp and its holder during insertion or withdrawal thereof from mounted position in the instrument; a further object being to form such bent end of the mounting stem for latching engagement in a cooperating receiver formed at the ocular end of the instrument; still another object being to so form the bent end of the support stem that, when latched, it will extend in position snugly disposed at the ocular end of the instrument, thereby affording minimum interference to manipulation of the instrument.

The foregoing and numerous other important objects, advantages and inherent functions of the invention will become apparent as the same are understood from the following description, which, taken in connection with the accompanying drawings, discloses the details of an inspection instrument embodying the present invention.

Referring to the drawings:

Fig. 1 is a perspective view of a hob suitable for cutting glare suppressing striations in a strip of inspection tube material;

Fig. 2 is a perspective view of the strip showing striations as formed therein by operation of the hob;

Fig. 3 is a sectional view through the hob;

Fig. 4 is a sectional view through a drawing die by means of which a striated strip may be worked to tubular form;

Fig. 5 is a perspective view of the strip in tubular form and having a longitudinal slot as produced by the die;

Figs. 6 and 7, respectively, are sectional views taken substantially along the lines 6—6 and 7—7 in Fig. 5;

Fig. 8 is a side elevation view of a small bore tube adapted for assembly with the longitudinally slotted tube to provide a viewing tube having a mounting duct for a lamp and its support stem;

Fig. 9 is a perspective view of a portion of the tube shown in Fig. 8;

Fig. 10 is a perspective view of the parts illustrated in Figs. 5–9, after the same have been assembled to form a viewing tube;

Fig. 11 is an enlarged sectional view taken through the distal end of the viewing tube shown in Fig. 10;

Fig. 12 is a perspective view of a fitting adapted for assembly at the ocular end of the viewing element shown in Fig. 10;

Fig. 13 is a sectional view through the viewing instrument;

Fig. 14 is an elevation view of a detachable eyepiece or viewer and its mounting clip;

Fig. 15 is a sectional view taken substantially along the line 15—15 in Figs. 13 and 14, showing the eyepiece and its mounting clip in mounted position on the instrument;

Fig. 16 is an enlarged sectional view taken substantially along the line 16—16 in Fig. 15;

Fig. 17 is a top plan view of a lamp and support stem forming a lamp mounting for use with the instrument shown in Fig. 13;

Fig. 18 is an enlarged sectional view taken substantially along the line 18—18 in Fig. 17;

Fig. 19 is an enlarged sectional view taken substantially along the line 19—19 in Fig. 18;

Fig. 20 is a perspective end view of the lamp supporting stem taken substantially along the line 20—20 in Fig. 17; and Fig. 21 is a perspective view of the ocular end of the instrument with lamp and eyepiece mounted in operative position.

To illustrate the invention the drawings show a bronchoscope 23 the same being an instrument particularly designed for the internal inspection of throat and bronchial tube surfaces. It will be apparent, however, that the features of the present invention are not necessarily limited specifically to bronchoscopes but may have utility and value in scope instruments generally. The instrument 23 comprises a preferably metallic viewing tube 24 having a distal end 25 adapted for insertion into a cavity to be inspected, an ocular end 26 through which the cavity surfaces to be viewed may be inspected, and a duct 27 extending in the walls of the viewing tube, between its distal and ocular ends, for the reception of a lamp 28 supported at the end of a mounting stem 29. The arrangement is such that the stem 29 may be inserted into the duct 27 at the ocular end of the viewing tube and pushed into place carrying the lamp 28 in order to mount the same in the tube at the distal end thereof.

The lamp 28 is of minute size and is preferably mounted at and immediately within the distal end of the viewing tube in position to illuminate tissues to be inspected through the open distal end of the tube. The lamp may be energized by suitable insulated conductors 30, which may extend through the mounting stem 29, from the lamp to the ocular end of the tube, the stem having bent portions 31, at its lamp remote end, fitted with an attachment socket 32 for connecting the conductors 30 with an external source of lamp energizing power.

Although the lamp 28, when energized, will deliver a relatively small amount of light, it will adequately illuminate the tissues to be inspected. A certain amount of light delivered from the lamp, however, will impinge upon the inner surfaces of the viewing tube and may be reflected through the viewing tube to its ocular end thereby interfering with and impairing the view of illuminated tissues received by an observer at the ocular end of the instrument. In order to eliminate such view impairing reflections of the light source upon the inner surfaces of the viewing tube, such inner surfaces are conditioned to render the same substantially non-reflective by scoring or striating such surfaces with a multiplicity of striations 33 on such inner surfaces and extending preferably transversely of the viewing tube. These striations conveniently and preferably take the form of shallow milled grooves of hair-line character formed in closely spaced relationship and extending around the inwardly facing surfaces of the viewing tube. Such striations break up the light reflecting qualities of the surfaces on which formed and substantially eliminate the transfer of reflected light through the tube from the distal to its ocular end, without, however, impairing the visibility of illuminated tissues viewed through the tube. On the contrary, viewing instruments, containing the reflection suppressing striations, afford sharp, bright images of viewed tissues, which are not impaired nor distorted in any way by light reflection interference.

In order to construct the viewing tube having the lamp supporting duct 27, extending longitudinally of the tube in the walls thereof, the same may be made up from a strip of preferably metallic tube material 34 and a preferably metallic duct forming tube of small bore 35. The striations 33 may be formed in the strip 34 while the same is in flat condition, as by passing the same laterally with respect to a milling cutter 36, the same comprising a plurality of thin saw discs 37 suitably clamped upon a shaft or axle 38. The saw discs 37 may be maintained in a desired spaced relation on the shaft as by means of spacing discs 39, to thereby determine the spacement of the grooves 33. After the grooves have been cut, the flat milled strip 34 may be drawn through a suitable forming die 40 to thereby bend the strip to tubular form, as shown more particularly in Fig. 5 of the drawings, the so formed tube having a slot 41 extending longitudinally from end to end thereof. This slot is defined by the spaced apart opposite side edges of the strip 34. The tube may be beveled at its distal end and provided with a beaded edge 42, said beaded edge preferably closing the slot 41 at the distal end of the tube. It will be seen that the striations 33 form shallow spaced annular grooves upon the inner surfaces of the tubular member 34, such shallow grooves extending at least at and adjacent the distal end of the tube and preferably throughout the inner surfaces of the tube from the distal to the ocular end thereof.

The small bore tube 35 may then be assembled in the slot 41 and welded, brazed or otherwise secured in said slot, the spaced apart edges of the strip 34 being thus secured to the tube 35 in integral fashion along opposite sides thereof, thereby strengthening and rigidifying the viewing tube structure. The surfaces of the tube 35 presented inwardly of the slot 41 are also preferably provided with striations 33a which may be formed in the tube prior to its assembly in the slot, by applying the tube surfaces to the cutter 36 in order to striate the inwardly facing surfaces of the tube 35 preferably through its entire length and at least at and adjacent the distal end thereof. At the distal end of the instrument, the inwardly facing portions of the tube 35 may be cut away, as at 43, to expose the lamp 28, when in mounted position, at the distal end of the tube.

In order to provide convenient means for manipulating the instrument, the ocular end 26 of the viewing tube 24, including its duct forming tube portions 35, is mounted in a support fitting 44 comprising a cylindrical collar 45 in which the end portions of the viewing tube are mounted and secured in any suitable fashion, as by welding or brazing. Outwardly of the end of the viewing tube, the fitting 44 is provided with arcuate slots 46 extending transversely of the fitting and opening through a common gate 47 at the end of the fitting. These arcuate slots 46 afford convenient means for latching the lamp mounting stem in operative position in the instrument. To this end the bent portions 31 of the stem preferably extend substantially at right angles with respect to the lamp supporting portions thereof. Said lamp supporting portions thus may be inserted, through the collar 45, into the duct 27 at the ocular end of the instrument and may be advanced into position to present the lamp 28 in the cut out portions 43 at the distal end of the viewing tube. In order to reach such position, the bent portion 31 of the lamp support may enter the slots 46 through the gate opening 47, the surfaces of the collar 45, defining one side of said slots, serving to engage the offset portions 31 of the lamp support and limit its inserting movement in the duct 27 when the lamp 28 has reached its operative position at the distal end of the instrument. The lamp mount may then be latched in assembled position by turning the bent portion 31, through substantially 90 degrees, to latch it in one or other of the latching slots 46. The lamp and its mounting stem, of course, may be removed from operative position in the instrument by reversing the mounting and latching procedure. If desired, the socket 32 may be arranged in axial alignment with the bent portion 31, or, as shown more particularly in Fig. 20 of the drawings, the same may be offset with respect to the bent stem latching portion 31 in order, that, when in latched position, the socket 32 may extend in a convenient, out-of-the-way position, with its axis lying in the plane including the axis of the support stem 20 and the bent portion 31, or in position substantially normal to said plane as shown, thereby facilitating manipulation of the instrument by locating the socket 32 in position nested with the fitting 44.

The collar 45 is provided with a stem 48, which preferably extends radially of the viewing tube and the duct forming tube 27. The fitting 44 may form a shoulder 49 at the collar connected end of the stem 48. Spaced from said shoulder the stem preferably carries a press fitted pin 50 extending diametrally therethrough, said pin 50 preferably extending in a direction parallel to the axis of the viewing tube. The end of the pin which extends toward the distal end of the instrument may be threaded for the reception of a clamp nut 51. The stem 48 provides a mounting for a detachable handle 52, which may be of any convenient or preferred shape. This handle has a socket 53 for the reception of the stem 48, and is provided with a diametral slot 54, at the open end of the socket 53, for the reception of the pin 50 therein on opposite sides of the socket. After the handle has been mounted on the stem 48 it may be clampingly secured in place, as by tightening the clamping nut 51.

The pin receiving portions of the handle are preferably formed to provide a clip seat 55, from which seat the end of the pin 50 remote from the clamp nut projects when the handle is in mounted position on the stem 48. The seat 55 and projecting end of the pin 50 afford a mounting for a detachable eyepiece viewing device 56, said device preferably comprising an adjustable telescope viewer provided with mounting clip means 57 comprising a resilient spring clip 58 having arms adapted to clippingly engage the clip seat 55, on opposite sides of the pin 50, and portions adapted to snugly receive the projecting end of the pin 50, therebetween, whereby, when mounted, the clip will be oriented on the fitting 44 in position to support the eyepiece 56 in viewing alignment with the viewing tube at its ocular end. The mounting clip means 57, also preferably comprises pivot means 59 whereby the eyepiece 56 may be swung on the mounting clip 58 to an offset position allowing direct ocular inspection through the viewing tube. To this end the pivot means 59 may comprise a cylindrical block 60 secured, as by fastening screws 61 to the clip 58 and having an axial bearing channel 62 for turnably receiving a pivot stem 63. The stem 63 at one end carries a bracket 64 on which the eyepiece or viewer 56 is mounted, said bracket having a portion overlying one end of the block 60 and provided with a projection 65 adapted to fit in a corresponding socket 66 formed in the end of the block 60 when the eyepiece is in viewing alignment with the viewing tube 24. The projection 65 may engage in a socket 67 when in offset position. The block 60, in its end opposite from the bracket 64, may be provided with a cavity 68 for receiving the bracket remote end of the stem 63, the stem being retained in the block 60, as by means of a fastening screw 69 having a stem threaded into the end of the stem 63 and a head fitting in the open end of the cavity 68. A resilient spring 70 may be interposed between the head of the fastening screw 69 and the bottom of the cavity 68 in order to yieldingly draw the stem in the channel 62 and the bracket 64 upon the end of the block 60 to yieldingly hold the pin 65 in one or other of the sockets 66 and 67.

The lamp supporting stem 29 may comprise a small bore, preferably metal, tube 71 fitted with a thin tubular layer of insulating material 72. Within this layer, at the lamp supporting end of the stem, may be press-fittingly mounted a cylindrical metal sleeve block 73 having a threaded central bore 74 for threading engagement with the correspondingly threaded base 75 of the lamp 28, said threaded base forming a lamp terminal contact which forms electrical connection with the sleeve 73. The lamp base 75 also comprises an axially disposed terminal 76, which is disposed within the sleeve when the lamp is in mounted position. The conductors 30 may extend within the tube 71 from the connecting socket 32 to the sleeve 73, the ends of said conductors being supported in an insulating block 77 adapted for attachment to the sleeve 73, as by threaded engagement therewith, said block having a central opening 78 therein for press-fittingly receiving one of the conductors and presenting the bared end thereof in position for engagement with the axial lamp terminal 76. The block 77 also has an opening 79 therein press-fittingly receiving the other conductor and presenting the bared end thereof for electrical connection with the sleeve 73, whereby an energizing circuit for the lamp may be provided within the tube 71. If desired, the tube 71 may be filled with a suitable insulating compound around the conductors 30 after the same and the lamp mounting sleeve 73 have been assembled. In any event the conductors 30 are of relatively fine gauge wire and are preferably insulated, at least by one or more coatings of shellac or other suitable insulation sufficient to relatively insulate the conductors the one from the other within the tube 71. The insulation, however, need be sufficient only to insulate against the relatively low voltage required for the operation of the lamp 28.

The viewing tube 24, near its distal end, may be provided with openings 80 and, adjacent the ocular end, the viewing tube may be connected to a pipe 81 formed, as at 82, for connection with external pressure means for delivery of such air or liquid, through the pipe 81, the viewing tube and the openings 80 as well as to the viewing opening at the distal end of the tube, as may be required for the medication of tissues, or the expansion thereof by air pressure.

The instrument is exceedingly compact and affords the advantage of a readily attachable eye-piece viewer, which may be mounted in aligned position, or as readily detached, and which may be swung to an offset position without detaching the same. The lamp and its support may be quickly and easily mounted in or removed from the instrument and may be latched in mounted position with a minimum of effort. The within described method of eliminating glare and hence of enhancing the view obtainable of tissues under observation, has the advantage that the instrument may be boiled or sterilized with steam without disturbing or impairing the glare eliminating striations since the same comprise the actual material of the viewing tube, glare elimination being accomplished without employing any film or coating of material apt to deteriorate in the presence of sterilizing liquids or vapors.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. An instrument for cavity inspection embodying a viewing tube forming a viewing channel and having a distal and an ocular end, said tube having means forming a duct in the walls thereof from the ocular to the distal end of the tube, said duct having a lateral opening communicating with the tube at the distal end thereof, said duct opening axially at the ocular end of the tube whereby to receive and support a lamp mounting stem in said duct in position presenting a lamp in said lateral opening at the distal end of the tube, said mounting stem having an offset latching end adapted to project from said duct, at the ocular end of the tube, bracket means at the ocular end of said tube forming a pair of oppositely opening circumferential slots for latchingly receiving the projecting end of said mounting stem upon rotation of said stem in either direction in mounted position in said duct, said bracket means forming a clamp for detachably receiving a handle to facilitate the manipulation of the instrument.

2. A viewing tube comprising walls defining a channel having a distal and an ocular end, the inner surfaces of said walls being formed with a multiplicity of closely spaced hair-line grooves therein to prevent light reflection on said walls, toward the ocular end of said channel.

3. A viewing tube for cavity inspection having a distal and an ocular end, and means to mount a lamp at and within the distal end of the tube, the inner surfaces of said tube being formed with closely spaced hair-line grooves therein substantially throughout the length of the tube from its distal toward its ocular end.

4. A viewing tube of thin, light weight, sheet material forming a viewing channel having a distal and an ocular end, the inner surfaces of said tube being formed with closely spaced, shallow, hair-line grooves disposed therein between the distal and ocular ends of the tube to suppress light reflection on said inner surfaces toward the ocular end of the tube.

5. A viewing tube having a distal and an ocular end and comprising an elongated strip of relatively thin sheet material curved transversely to tubular form, with the opposed side edges in spaced relation, and a tubular element disposed in the space between said spaced side edges and secured thereto to form a longitudinal duct in the wall of said tube, extending from the distal to the ocular end thereof.

6. A viewing tube having a distal and an ocular end and comprising an elongated strip of relatively thin sheet material curved transversely to tubular form, with the opposed side edges in spaced relation, and a tubular element disposed in the space between said spaced side edges and secured thereto to form a longitudinal duct in the wall of said tube, extending from the distal to the ocular end thereof, said tubular element, at the distal end of the tube, having a lateral opening facing into the tube, whereby said duct is adapted to receive and support a lamp supporting stem therein, in position mounting said lamp in said opening.

7. A viewing tube having a distal and an ocular end and comprising an elongated strip of relatively thin sheet material curved transversely to tubular form, with the opposed side edges in spaced relation, and a tubular element disposed in the space between said spaced side edges and secured thereto to form a longitudinal duct in the wall of said tube, extending from the distal to the ocular end thereof, said strip having shallow, groove-like striations formed transversely of the strip on the inner surfaces thereof to suppress light reflection on said surfaces toward the ocular end of the tube.

8. A viewing tube having a distal and an ocular end and comprising an elongated strip of relatively thin sheet material curved transversely to tubular form, with the opposed side edges in spaced relation, a tubular element disposed in the space between said spaced side edges and secured thereto to form a longitudinal duct in the wall of said tube, extending from the distal to the ocular end thereof, said strip having shallow, groove-like striations formed transversely of the strip on the inner surfaces thereof to suppress light reflection on said surfaces toward the ocular end of the tube, and shallow hair-line grooves formed on the surfaces of said tubular element facing into the tube.

WILLIAM J. CAMERON.

REFERENCES CITED

The following references are of record in the file of this patent:

UNITED STATES PATENTS

| Number | Name | Date |
|---|---|---|
| 951,285 | Meyer | Mar. 8, 1910 |
| 1,222,478 | Sheaff | Apr. 10, 1917 |
| 1,896,861 | Cameron | Feb. 7, 1933 |
| 1,918,206 | Ermisch | July 11, 1933 |
| 1,945,380 | Russell | Jan. 30, 1934 |
| 2,235,979 | Brown | Mar. 25, 1941 |
| 2,243,285 | Pope | May 27, 1941 |
| 2,346,291 | Cisski | Apr. 11, 1944 |